(12) United States Patent
Lee et al.

(10) Patent No.: US 11,029,562 B2
(45) Date of Patent: Jun. 8, 2021

(54) BACKLIGHT UNIT AND LIQUID CRYSTAL DISPLAY DEVICE INCLUDING THE SAME

(71) Applicant: LG Display Co., Ltd., Seoul (KR)

(72) Inventors: Rok-Hee Lee, Paju-si (KR); Yong-Seok Kwak, Paju-si (KR); Il-Soo Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/165,779

(22) Filed: Oct. 19, 2018

(65) Prior Publication Data
US 2019/0129249 A1 May 2, 2019

(30) Foreign Application Priority Data
Oct. 31, 2017 (KR) .......................... 10-2017-0144067

(51) Int. Cl.
| | |
|---|---|
| *G02F 1/13357* | (2006.01) |
| *G09G 3/36* | (2006.01) |
| *G09G 3/34* | (2006.01) |
| *G02F 1/1335* | (2006.01) |
| *G02B 5/02* | (2006.01) |

(52) U.S. Cl.
CPC ....... *G02F 1/133605* (2013.01); *G02B 5/021* (2013.01); *G02F 1/133504* (2013.01); *G02F 1/133603* (2013.01); *G02F 1/133606* (2013.01); *G09G 3/3406* (2013.01); *G09G 3/36* (2013.01); *G02F 1/133614* (2021.01); *G09G 3/342* (2013.01); *G09G 2310/08* (2013.01); *G09G 2320/0626* (2013.01)

(58) Field of Classification Search
CPC ......... G02F 1/133606; G02F 1/133504; G02F 2001/133607; G02B 6/0051; G02B 5/0247; G02B 5/0215; G02B 5/0242; G02B 5/0268; G02B 5/0278; G02B 6/0061
See application file for complete search history.

(56) References Cited

U.S. PATENT DOCUMENTS 6,473,220 B1* 10/2002 Clikeman ................ G02B 5/20
359/245
7,470,038 B2* 12/2008 Peng .................... G02B 5/0215
362/223
(Continued)

FOREIGN PATENT DOCUMENTS

| CN | 1758116 A | 4/2006 |
|---|---|---|
| CN | 1763609 A | 4/2006 |

(Continued)

*Primary Examiner* — Michael H Caley
*Assistant Examiner* — Jonathan Y Jung
(74) *Attorney, Agent, or Firm* — Seed IP Law Group LLP

(57) ABSTRACT

A liquid crystal display device comprises a liquid crystal panel and a backlight unit under the liquid crystal panel and including a circuit board; a plurality of LED packages mounted on the circuit board; an encapsulation member over the circuit board and covering the plurality of LED packages; and a multi-pattern sheet over the encapsulation member and including a glass complex body containing a phosphor and a plurality of diffusion patterns on an upper surface of the glass complex body, wherein the plurality of diffusion patterns include at least one first pattern corresponding to an LED package and at least one second pattern corresponding to a portion between adjacent LED packages.

24 Claims, 9 Drawing Sheets

(56) References Cited

U.S. PATENT DOCUMENTS

| | | | | |
|---|---|---|---|---|
| 2005/0073495 | A1* | 4/2005 | Harbers | G02F 1/133603 345/102 |
| 2006/0103790 | A1* | 5/2006 | Choi | G02F 1/133606 349/112 |
| 2007/0035940 | A1* | 2/2007 | Yao | G02B 5/0215 362/23.18 |
| 2007/0110386 | A1* | 5/2007 | Chiang | G02B 5/0278 385/147 |
| 2007/0284565 | A1* | 12/2007 | Leatherdale | H01L 33/08 257/13 |
| 2008/0089063 | A1* | 4/2008 | Chen | G02B 3/0056 362/246 |
| 2011/0051412 | A1* | 3/2011 | Jeong | G02F 1/133603 362/235 |
| 2011/0249215 | A1* | 10/2011 | Jung | G02F 1/133611 349/61 |
| 2015/0276151 | A1 | 10/2015 | Chen | |
| 2018/0059482 | A1* | 3/2018 | Li | F21V 3/10 |

FOREIGN PATENT DOCUMENTS

| | | |
|---|---|---|
| CN | 1769977 A | 5/2006 |
| CN | 101276098 A | 10/2008 |
| JP | 2005-221619 A | 8/2005 |
| KR | 10-2011-010431 A | 9/2011 |
| KR | 10-2012-0034998 A | 4/2012 |

* cited by examiner

BACKLIGHT UNIT AND LIQUID CRYSTAL DISPLAY DEVICE INCLUDING THE SAME

CROSS-REFERENCE TO RELATED APPLICATION(S)

The present application claims priority from and the benefit under 35 U.S.C § 119(a) of Korean Patent Application No. 10-2017-0144067 filed on Oct. 31, 2017, which is hereby incorporated by reference in its entirety.

BACKGROUND

Technical Field

The present disclosure relates to a backlight unit and a liquid crystal display device including the same.

Description of the Related Art

With rapid development of information technologies, display devices for displaying a large amount of information have been promptly developed. Recently, flat panel display devices having a thin profile, light weight and low power consumption, such as liquid crystal display devices or electroluminescent display devices, have been suggested and widely applied.

Among the flat panel display devices, liquid crystal display devices have been widely used due to their small sizes, light weights, thin thicknesses, and low power consumption. A liquid crystal display device includes a liquid crystal panel displaying an image and a backlight unit disposed under the liquid crystal panel to providing light to the liquid crystal panel.

Backlight units are classified into an edge-type and a direct-type according to a method of arranging a light source.

In an edge-type backlight unit, a light source is disposed on a side surface of a light guide plate disposed below a light crystal panel, and light emitted from the light source is converted into surface light through the light guide plate and provided to the liquid crystal panel. However, in the edge-type backlight unit, since the light source is on the side, there is a restriction in implementing a local dimming method in which the backlight unit is divided into a plurality of regions and driven for each region.

Meanwhile, in a direct-type backlight unit, a plurality of light sources are disposed under a liquid crystal display panel, and light emitted from the light sources is directly provided to an entire surface of the liquid crystal panel. In the direct-type backlight unit, uniformity and brightness of light provided to the liquid crystal panel can be improved, and the local dimming method can be implemented, so that a contrast ratio can be improved and power consumption can be reduced.

However, in the direct-type backlight unit, since the light sources are disposed under the liquid crystal display panel and light is directly provided to the liquid crystal panel, a mura such as a hot spot may occur over the light sources, and image quality may be decreased.

BRIEF SUMMARY

Accordingly, the present disclosure is directed to a backlight unit and a liquid crystal display device including the same that substantially obviate one or more of the problems due to limitations and disadvantages of the related art.

An object of the present disclosure is to provide a backlight unit and a liquid crystal display device including the same that prevent the mura such as the hot spot and the decrease of the image quality.

Another object of the present disclosure is to provide a backlight unit and a liquid crystal display device including the same that reduce the thickness of the backlight unit and realize a thin profile.

Additional features and advantages of the present disclosure will be set forth in the description which follows, and in part will be apparent from the description, or may be learned by practice of the present disclosure. The objectives and other advantages of the present disclosure will be realized and attained by the structure particularly pointed out in the written description and claims hereof as well as the appended drawings.

To achieve these and other advantages and in accordance with the purpose of the present disclosure, as embodied and broadly described herein, there is provided a backlight unit includes a circuit board; a plurality of LED packages mounted on the circuit board; an encapsulation member over the circuit board and covering the plurality of LED packages; and a multi-pattern sheet over the encapsulation member and including a glass complex body containing a phosphor and a plurality of diffusion patterns on an upper surface of the glass complex body, wherein the plurality of diffusion patterns include at least one first pattern corresponding to each LED package and at least one second pattern corresponding to a portion between adjacent LED packages.

In another aspect, a backlight unit includes a circuit board; a plurality of LED packages mounted on the circuit board; an encapsulation member over the circuit board and covering the plurality of LED packages; and a multi-pattern sheet over the encapsulation member and including a glass complex body containing a phosphor, a plurality of diffusion patterns on an upper surface of the glass complex body, and a plurality of reflective patterns on a lower surface of the glass complex body, wherein the plurality of diffusion patterns include at least one first pattern corresponding to each LED package and at least one second pattern corresponding to a portion between adjacent LED packages, and wherein each LED package, each reflective pattern and the at least one first pattern overlap each other in a vertical direction transverse to an upper surface of the LED packages.

In another aspect, a liquid crystal display device comprises a liquid crystal panel and a backlight unit under the liquid crystal panel and including a circuit board; a plurality of LED packages mounted on the circuit board; an encapsulation member over the circuit board and covering the plurality of LED packages; and a multi-pattern sheet over the encapsulation member and including a glass complex body containing a phosphor and a plurality of diffusion patterns on an upper surface of the glass complex body, wherein the plurality of diffusion patterns include at least one first pattern corresponding to each LED package and at least one second pattern corresponding to a portion between adjacent LED packages.

It is to be understood that both the foregoing general description and the following detailed description are by example and explanatory and are intended to provide further explanation of the present disclosure as claimed.

BRIEF DESCRIPTION OF THE SEVERAL VIEWS OF THE DRAWINGS

The accompanying drawings, which are included to provide a further understanding of the present disclosure and which are incorporated in and constitute a part of this specification, illustrate an embodiment of the present disclosure and together with the description serve to explain the principles of the present disclosure. In the drawings.

DETAILED DESCRIPTION

Reference will now be made in detail to exemplary embodiments of the disclosure, examples of which are illustrated in the accompanying drawings.

Figure 1:
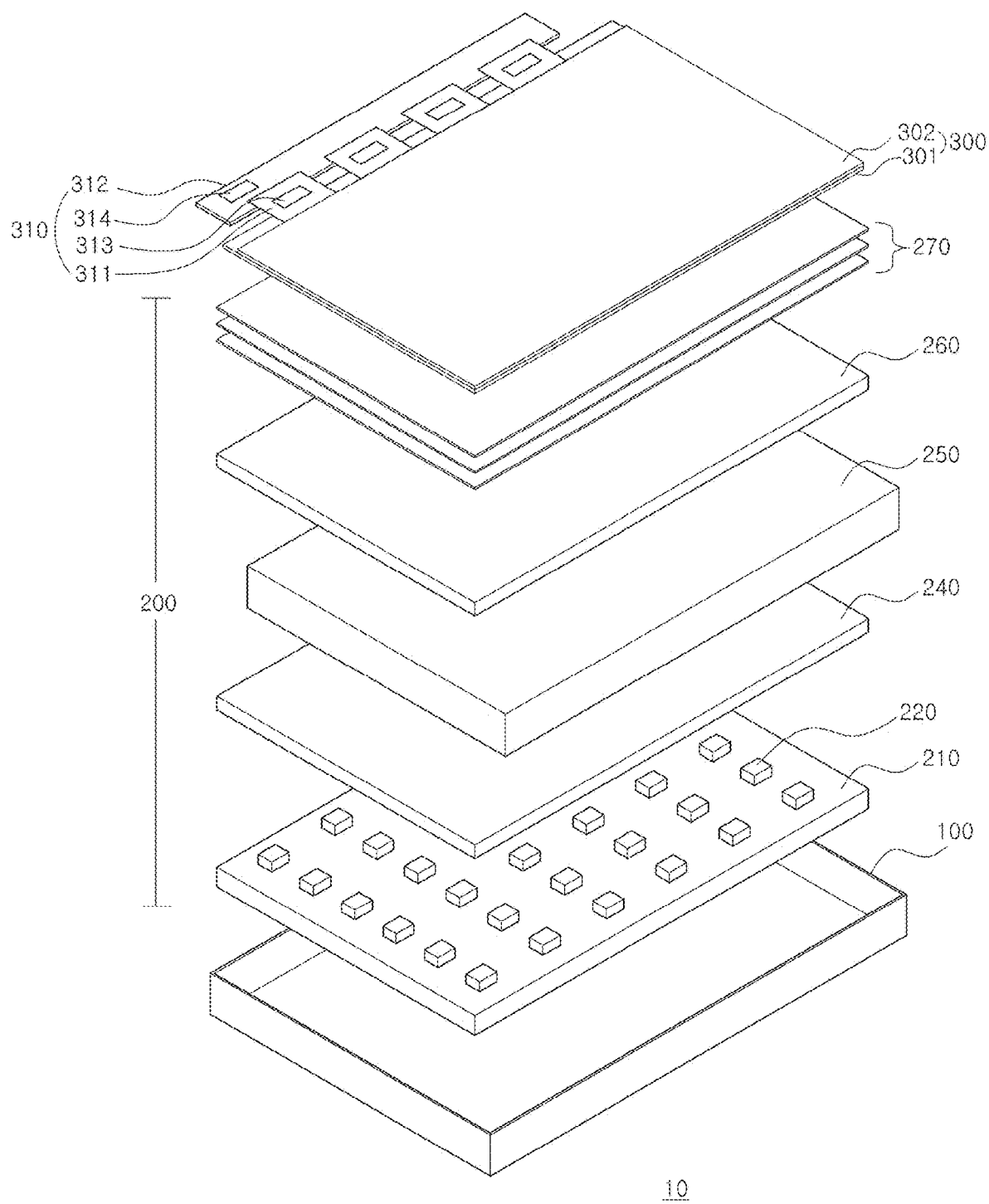
FIG. 1 is a schematic exploded perspective view of a liquid crystal display device according to a first embodiment of the present disclosure.
Figure 2:
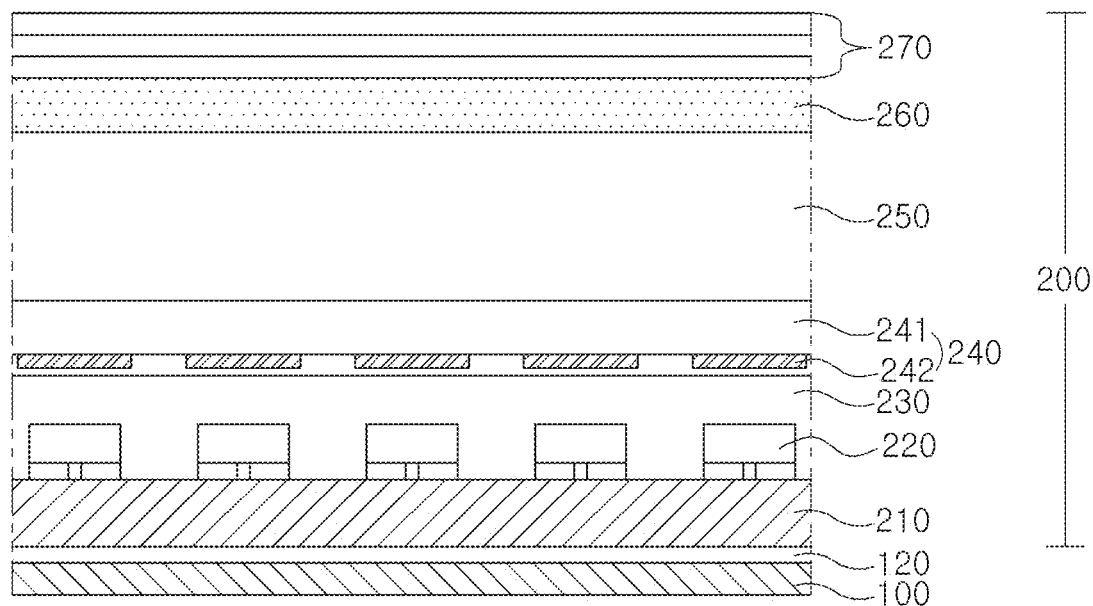
FIG. 2 is a schematic cross-sectional view of a backlight unit according to the first embodiment of the present disclosure.

FIG. 1 is a schematic exploded perspective view of a liquid crystal display device according to a first embodiment of the present disclosure, and FIG. 2 is a schematic cross-sectional view of a backlight unit according to the first embodiment of the present disclosure.

In FIG. 1 and FIG. 2, the liquid crystal display device 10 according to the first embodiment of the present disclosure includes a backlight unit 200, a liquid crystal panel 300, a panel driving circuit 310, and a bottom cover (or lower cover) 100.

The bottom cover 100 is disposed below the backlight unit 200 and supports the backlight unit 200. Here, the bottom cover 100 may be considered as a component included in the backlight unit 200.

The bottom cover 100 can be formed in a box shape with an open upper portion so as to receive the backlight unit 200 therein, but the present disclosure is not limited thereto. For example, the bottom cover 100 may be formed in a plate shape.

Meanwhile, although not shown in the figures, the liquid crystal display device 10 may further include a guide panel surrounding and supporting sides of the backlight unit 200 and the liquid crystal panel 300 and a top cover covering edges of a top surface of the liquid crystal panel 300.

The backlight unit 200 according to the first embodiment of the present disclosure is a direct-type backlight unit in which a plurality of light sources, for example, light emitting diodes (LEDs) are spaced apart from each other with a predetermined distance therebetween and are disposed directly under and face the liquid crystal panel 300.

The backlight unit 200 can include a circuit board 210, a plurality of LED packages 220, an encapsulation member 230, a reflective pattern sheet 240, a diffusion plate 250, a fluorescent sheet 260, and an optical sheet 270.

The circuit board 210 is disposed on a top surface of the bottom cover 100. The circuit board 210 can be attached to the bottom cover 100 through ah adhesive member 120 such as a double-sided adhesive.

The plurality of LED packages 220 are mounted on a top surface of the circuit board 210. The top surface of the circuit board 210 can have a reflection property, for example, by forming a reflection layer on the top surface of the circuit board 210. In this case, light traveling toward the circuit board 210 can be reflected by the circuit board 210 and travel toward the liquid crystal panel 300.

The LED package 220 mounted on the circuit board 210 emits light by a driving signal supplied from a backlight driving portion (not shown).

The LED package 220 can have various structures. For example, the LED package 220 can have a lateral chip structure, a flip chip structure, a vertical chip structure, a chip scale package (CSP) structure, or the like. In addition, the LED package 220 can further include a reflector over an LED chip, but the present disclosure is not limited thereto. The LED package 220 will be described in detail with reference to FIGS. 3A to 3C.

Figure 3A:
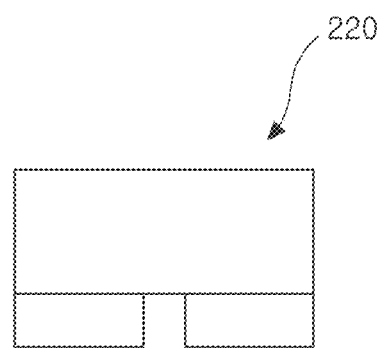
FIGS. 3A to 3C are schematic cross-sectional views of LED packages according to an embodiment of the present disclosure.

In FIG. 3A, the LED package 220 of the present disclosure can have a flip chip structure. For example, the LED package 220 can have a blue flip chip structure emitting blue light, but the present disclosure is not limited thereto. In this case, the LED package 220 can have a beam angle of about 110 degrees to about 120 degrees.

Figure 3B:
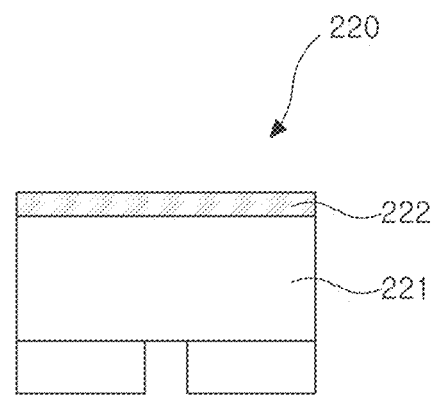

In FIG. 3B, the LED package 220 of the present disclosure can have a flip chip structure including a reflection member 222. That is, the LED package 220 of the present disclosure can include an LED chip 221 and the reflection member 222 over the LED chip 221. In this case, the reflection member 222 can be formed of a reflective material Ag or $TiO_2$, but the present disclosure is not limited thereto. Alternatively, the reflection member 222 can have a structure in which two layers having different refractive indexes are alternately stacked. The LED package 220 including the reflection member 222 can have a larger beam angle than that of the LED package 220 of FIG. 3A, and the LED package 220 including the reflection member 222 can have a beam angle of about 110 degrees to about 160 degrees.

Figure 3C:
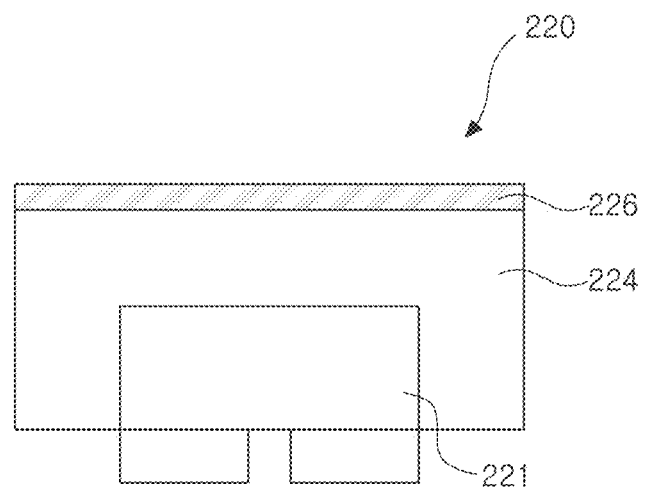

In FIG. 3C, the LED package 220 of the present disclosure can have a CSP structure. Such a LED package 220 can include an LED chip 221 and a mold 224 surrounding the LED chip 221 and can further include a reflection member 226 over the mold 224.

Here, the mold 224 can be formed of a clear resin and can have a refractive index of 1.5 or more. For example, the mold 224 can have a refractive index of about 1.5 to about 1.7, but the present disclosure is not limited thereto. In addition, an overall width of the mold 224 can be about two times to about two and a half times a width of the LED chip 221.

In the LED package 220 having the CSP structure, its size can be minimized, and thus a thickness of the backlight unit 200 can be reduced. Further, the LED package 220 having the CSP structure can have excellent processability and can increase light efficiency as compared with the LED package 220 of FIG. 3B having the flip chip structure.

In the case that the LED package 220 having the CSP structure is applied, the encapsulation member 230 can be omitted.

Meanwhile, as shown in FIGS. 3B and 3C, when the LED package 220 includes the reflection member 222 and 226, the reflective pattern sheet 240 can be omitted.

Next, the encapsulation member (or encapsulation mold) 230 can be formed over the plurality of LED packages 220 to cover an entire surface of the circuit board 210 on which the plurality of LED packages 220 are mounted. The encapsulation member 230 can be applied to the circuit board 210 to a thickness greater than that of the LED package 220 and cover all the LED packages 220 mounted on the circuit board 210. The encapsulation member 230 can stably fix the LED packages 220 on the circuit board 210 and protect the LED packages 220 from the outside.

Here, the encapsulation member 230 can have a refractive index of about 1.5 to 1.7, but the present disclosure is not limited thereto.

The encapsulation member 230 can be formed of a resin-based material including silicone, UV resin, polycarbonate (PC) and polymethyl methacrylate (PMMA), for example, and the present disclosure is not limited thereto.

Then, the diffusion plate 250 is disposed over the encapsulation member 230. The diffusion plate 250 can diffuse light emitted from the plurality of LED packages 220 and provide uniform surface light to the liquid crystal panel 300.

Meanwhile, the reflective pattern sheet 240 having a film shape can be provided between the encapsulation member 230 and the diffusion plate 250. The reflective pattern sheet 240 can include a base substrate 241 and a plurality of first reflective patterns 242 that are formed on a lower surface of the base substrate 241 and are disposed to correspond to the LED packages 220, respectively.

Here, the reflective pattern 242 reflects a part of light, which is emitted upwardly from the corresponding LED package 220 located thereunder, and distributes the part of the light in a side direction. A remaining part of the light is transmitted by the reflective pattern 242 and travels upwardly. Accordingly, most of the light is prevented from traveling in a vertical upward direction and from being incident on the liquid crystal panel 300. Therefore, it is possible to prevent a hot spot caused by light incidence in the vertical upward direction, and the deterioration of the image quality due to the hot spot can be improved.

The fluorescent sheet 260 can be disposed on the diffusion plate 250. The fluorescent sheet 260 can include at least one phosphor (or fluorescent substance) absorbing a part of first color light generated in the LED package 220 and generating light of at least one color different from the first color.

In the case of using the fluorescent sheet 260, the first color light generated in the LED package 220 and the light of the color generated by the fluorescent sheet 260 are mixed to finally produce white light, and the white light can be provided to the liquid crystal panel 300.

For example, when the LED package 220 generates blue light as the first color light, the fluorescent sheet 260 can absorb a part of the blue light and generate yellow light as a second color light.

Alternatively, when the LED package 220 generates white light, the fluorescent sheet 260 can be omitted.

The optical sheet 270 including at least one sheet can be disposed on the fluorescent sheet 260. The at least one sheet can be a light-concentrating sheet, for example. In the first embodiment of the present disclosure, the optical sheet 270 includes three sheets, but the present disclosure is not limited thereto.

The liquid crystal panel 300 is disposed over the backlight unit 200. The liquid crystal panel 300 controls light transmittance of a liquid crystal layer and displays an image. The liquid crystal panel 300 can include a first substrate (or a lower substrate) 301, a second substrate (or an upper substrate) 302 facing and attached to the first substrate 301, and a liquid crystal layer (not shown) interposed between the first and second substrates 301 and 302. On the other hand, although not shown in the figures, a first polarizer and a second polarizer can be attached to outer surfaces of the first substrate 301 and the second substrate 302, respectively.

In the liquid crystal panel 300, the liquid crystal layer can be operated for each pixel by an electric field, which is generated by a data voltage and a common voltage applied to each pixel, and thus a color image can be displayed according the light transmittance of the liquid crystal layer.

The panel driving portion 310 can be connected to a pad portion provided on the first substrate 301 and drive each pixel of the liquid crystal panel 300. For example, the panel driving portion 310 can include a plurality of circuit films 311 connected to the pad portion of the liquid crystal panel 300, a data IC 313 mounted on each circuit film 311, a display printed circuit board 312 connected to the circuit films 311, and a timing control circuit 314 mounted on the display printed circuit board 312.

The timing control circuit 314 can sort and process digital image data input from an external driving system (not shown) to generate pixel data for respective pixels of the liquid crystal panel 300, in response to timing synchronization signals supplied from the external driving system, and supply the pixel data to the data IC 313. In addition, the timing control circuit 314 can generate a data control signal and a gate control signal based on the timing synchronization signals to control driving timing of each of the data IC 313 and a gate IC (not shown).

Further, the timing control circuit 314 can control an emission operation of the backlight unit 200 according to a local dimming method and individually control brightness of the liquid crystal panel 300 for each region.

As described above, in the embodiment of the present disclosure, since the backlight unit 200 is a direct-type backlight unit, the local dimming method in which the liquid crystal panel 300 is driven for each region can be realized. Thus, a contrast ratio can be improved, and power consumption can be reduced.

Further, since the reflective pattern sheet 240, which includes the reflective patterns 241 corresponding to the respective LED packages 220, is provided, light output in the vertical upward direction can be reduced, and the hot spot can be prevented, thereby improving the image quality.

In addition, the light can be reflected by the reflective pattern sheet 240 and travel in the side direction, and thus an optical gap of the direct-type backlight unit 200 can be reduced. Accordingly, a thickness of the backlight unit 200 can be decreased, and the liquid crystal display device 10 in a thin profile can be implemented. Moreover, a halo phenomenon in which light is output beyond a local dimming region can be prevented due to a decrease of the optical gap.

Second Embodiment

Figure 4:
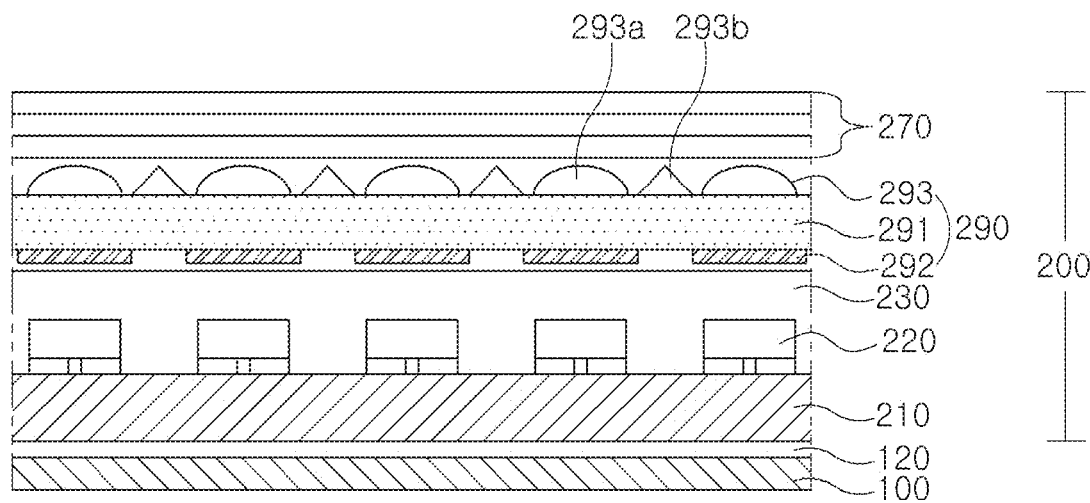
FIG. 4 is a schematic cross-sectional view of a backlight unit according to a second embodiment of the present disclosure.

FIG. 4 is a schematic cross-sectional view of a backlight unit according to a second embodiment of the present disclosure.

Hereinafter, for convenience of explanation, the same reference numerals are given to the similar or same parts as those of the first embodiment, and a description thereof will be omitted or simplified.

In FIG. 4, the backlight unit 200 according to the second embodiment includes a multi-pattern sheet 290, which is a single multi-functional sheet having functions of the reflective pattern sheet 240 of FIG. 2, the diffusion plate 250 of FIG. 2 and the fluorescent sheet 260 of FIG. 2 of the backlight unit 200 of the first embodiment.

The multi-pattern sheet 290 can include a glass complex body 291 as a base substrate, a plurality of reflective patterns 292 formed on a lower surface of the glass complex body 291, which is a surface facing the LED packages 220, and a plurality of diffusion patterns 293 on an upper surface of the glass complex body 291, which is an opposite surface facing the optical sheet 270. Here, the glass complex body 291 can include at least one phosphor (or fluorescent substance) therein. The phosphor can absorb a part of first color light generated in the LED package 220 and generate light of at least one color different from the first color.

Figure 5:
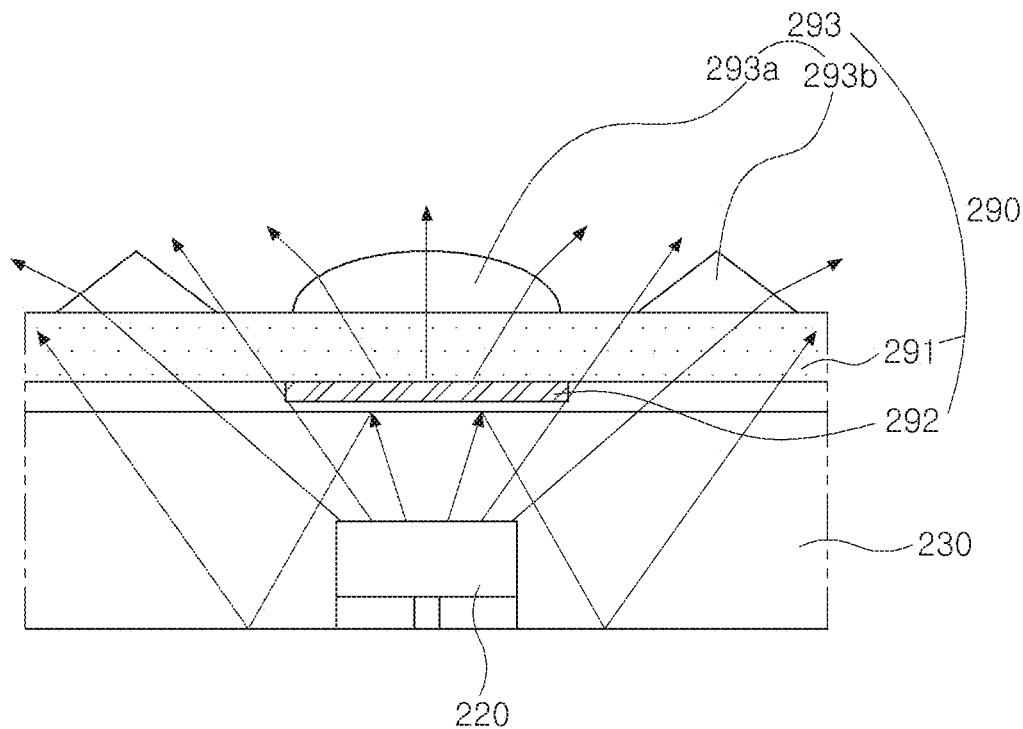
FIG. 5 is a cross-sectional view schematically showing a path of light in a backlight unit according to the second embodiment of the present disclosure.

Referring to FIG. 5, which shows a path of light in a multi-pattern sheet of the present disclosure, the reflective pattern 292 substantially the same as the reflective pattern 242 of the first embodiment reflects a part of light, which is emitted upwardly from the LED package 220 located thereunder, and distributes the part of the light in a side direction. A remaining part of the light is transmitted by the reflective pattern 292 and travels upwardly.

In addition, the diffusion pattern 293 diffuses incident light substantially the same as the diffusion plate 250 of the first embodiment.

In the second embodiment, since the single multi-pattern sheet 290 includes the reflective pattern 292 and the diffusion pattern 293 and performs the functions of the reflective pattern sheet 240 and the diffusion plate 250 of the first embodiment, uniform surface light is generated and output upwardly.

Further, the glass complex body 291 of the multi-pattern sheet 290 includes at least one phosphor therein and performs the function of the fluorescent sheet 260 of the first embodiment. Therefore, the first color light generated in the LED package 220 and the light of the color generated by the phosphor can be mixed, and white light can be output upwardly.

Accordingly, in the second embodiment of the present disclosure, a thickness of the backlight unit 200 can be further reduced as compared to the first embodiment by implementing the single multi-pattern sheet 290.

Hereinafter, the multi-pattern sheet 290 and the backlight unit 200 including the same according to the second embodiment of the present disclosure will be described in detail.

The glass complex body 291, which is the base substrate of the multi-pattern sheet 290, is formed of glass containing a phosphor. The glass complex body 291 can be formed by vitrifying a glass powder and a phosphor powder. Alternatively, the glass complex body 291 can be formed by sintering a glass frit containing a phosphor.

A thickness of the glass complex body 291 may be about 120 μm to about 250 μm for a desired color implementation, but the present disclosure is not limited thereto.

The plurality of reflective patterns 292 formed on the lower surface of the glass complex body 291 are spaced apart from each other by a predetermined distance and are arranged to correspond to the plurality of LED packages 220 mounted on the circuit board 210 and spaced apart from each other, respectively. At this time, a width of the reflective pattern 292 can be equal to or greater than a width of the LED package 220.

When the width of the reflective pattern 292 is d, it is preferable that d satisfies the relationship of the following equation (1).

$$d=2\{(b-c)\tan(\theta/2)\} \quad \text{equation (1)}$$

Here, b is a height (i.e., thickness) of the encapsulation member 230, c is the height (i.e., thickness) of the LED package 220, and θ is a beam angle of light emitted by the LED package 220. The beam angle θ is the full beam angle of light emitted by the LED package 220 rather than the half beam angle of light emitted by the LED package 220. At this time, the maximum thickness of the encapsulation member 230 on the LED package 220 can be four times the thickness of the LED package 220. That is, the maximum value of (b−c) can be 4c.

On the other hand, the beam angle θ of the LED package 220 can be about 110 degrees to about 160 degrees, and the thickness c of the LED package 220 can be about 150 but the present disclosure is not limited thereto. Also, for example, each of the width and length of the LED package 220 can be about 700 μm.

For example, the reflective patterns 292 can be formed on a lower surface of the glass complex body 291 by a printing method, but the present disclosure is not limited thereto. The reflective patterns 292 can be formed of a material having a reflective property, for example, metal, titanium oxide (TiO₂), a dichroic dye, or the like, but the present disclosure is not limited thereto.

The reflective patterns 292 can be formed in a circular shape or a polygonal shape such as a tetragonal shape in plan view.

As describe above, the reflective patterns 292 can have different transmittances depending on a position so as to reflect a part of the incident light and transmit a remaining part of the incident light, and this will be described with reference to FIGS. 6A to 6C.

Figure 6A:
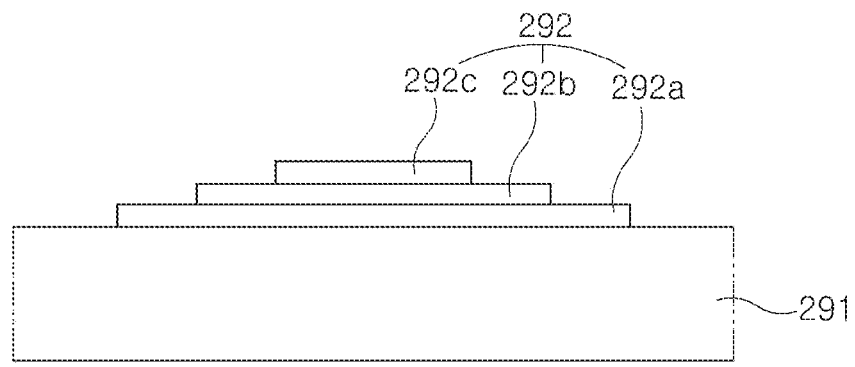
FIG. 6A is a schematic cross-sectional view of a reflective pattern according to an embodiment of the present disclosure.
Figure 6B:
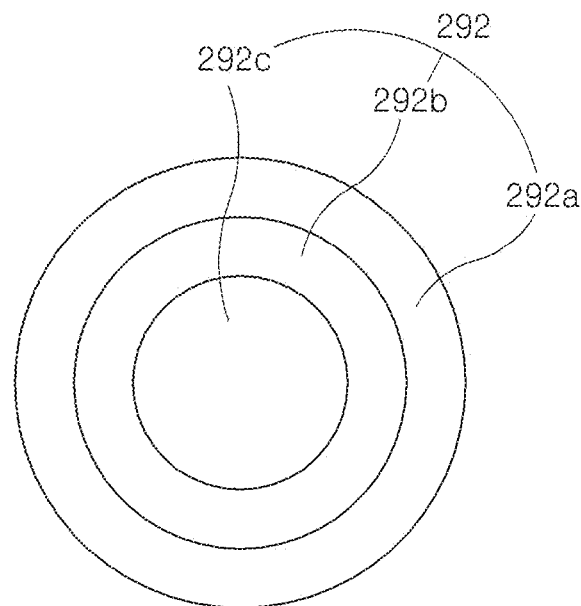
FIGS. 6B and 6C are schematic plan views of the reflective pattern according to the embodiment of the present disclosure.
Figure 6C:
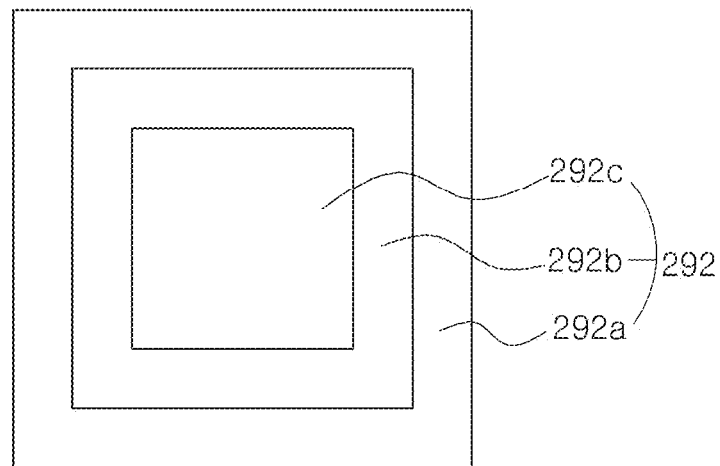

FIG. 6A is a schematic cross-sectional view of the reflective pattern according to the embodiment of the present disclosure, and FIGS. 6B and 6C are schematic plan views of the reflective pattern according to the embodiment of the present disclosure.

In FIG. 6A, the reflective pattern 292 according to the embodiment of the present disclosure includes a first pattern layer 292a, a second pattern layer 292b and a third pattern layer 292c sequentially formed on the glass complex body 291. For example, the first, second and third pattern layers 292a, 292b and 292c can be formed of titanium oxide (TiO₂).

Here, an area of the second pattern layer 292b is smaller than an area of the first pattern layer 292a, and an area of the third pattern layer 292c is smaller than the area of the second pattern layer 292b. That is, the area of the second pattern layer 292b is smaller than the area of the first pattern layer 292a and larger than the area of the third pattern layer 292c. Further, centers of the first, second and third pattern layers 292a, 292b and 292c are located on the same line.

Accordingly, a center portion of the reflective pattern 292 in which the first, second and third pattern layers 292a, 292b and 292c are stacked has the lowest light transmittance, an edge portion of the reflective pattern 292 in which only the first pattern layer 292a is located has the highest light transmittance, and a portion of the reflective pattern 292 in which the first and second pattern layers 292a and 292b are stacked has a light transmittance higher than that of the center portion of the reflective pattern 292 and lower than that of the edge portion of the reflective pattern 292.

The reflective pattern 292 can have a circular shape in plan view as shown in FIG. 6B or a tetragonal shape in plan view as shown in FIG. 6C, but the present disclosure is not limited thereto.

Alternatively, the reflective pattern 292 can have a transmission portion therein.

Meanwhile, the plurality of diffusion patterns 293 formed on the upper surface of the glass complex body 291 can include first patterns 293a and second patterns 293b alternately arranged. At this time, the first pattern 293a and the second pattern 293b adjacent to each other can be arranged to be spaced apart from each other or in contact with each other according to required optical characteristics. In this embodiment, the first pattern 293a and the second pattern 293b adjacent to each other are spaced apart from each other by a predetermined distance, as an example.

Figure 7:
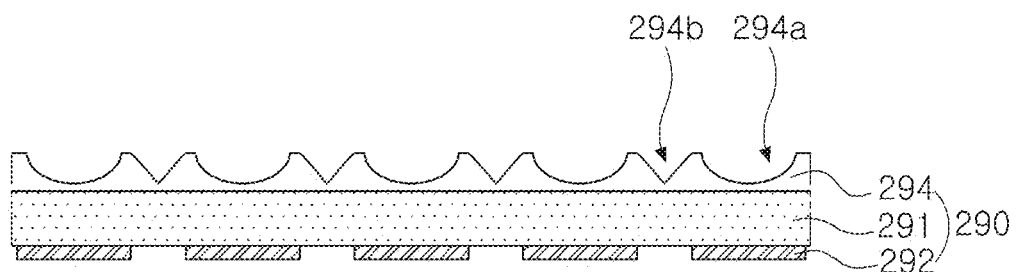
FIG. 7 is a schematic cross-sectional view of a multi-pattern sheet including a depressed diffusion pattern according to the second embodiment of the present disclosure.

The diffusion pattern 293 including the first pattern 293a and the second pattern 293b corresponds to a lens pattern that performs a light diffusion function and can be formed as an embossed pattern or a depressed pattern. In this regard, FIGS. 4 and 5 illustrate a diffusion pattern 293 including a first pattern 293a and a second pattern 293b of embossed patterns as an example. Alternatively, in FIG. 7, a diffusion pattern 294 including a first pattern 294a and a second pattern 294b is shown as an example. Here, the depressed diffusion pattern 294 can have a shape recessed into a substrate other than the glass complex body 291. Alternatively, the depressed diffusion pattern 294 can have a shape recessed into the glass complex body 291, and in this case, it is possible to realize an effect of reducing the thickness of the multi-pattern sheet 290 as compared with the embossed diffusion pattern 293 protruding out of the glass complex body 291.

Referring again to FIGS. 4 and 5, the first pattern 293a and the second pattern 293b of the diffusion pattern 293 have different shapes. For example, the first pattern 293a can have a semicircular cross-sectional shape, and the second pattern 293b can have a triangular cross-sectional shape, but the present disclosure is not limited thereto. The shapes of the first pattern 293a and the second pattern 293b will be described with reference to FIGS. 8A to 8D.

Figure 8A:
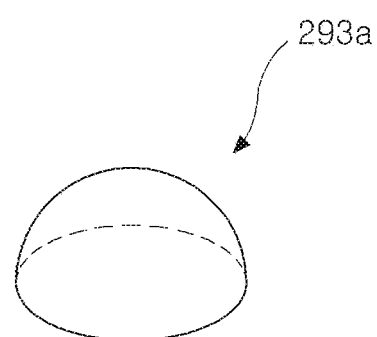
FIGS. 8A to 8D are views schematically showing shapes of the diffusion pattern according to the second embodiment of the present disclosure.
Figure 8B:
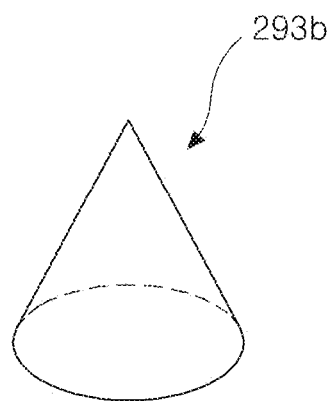
Figure 8C:
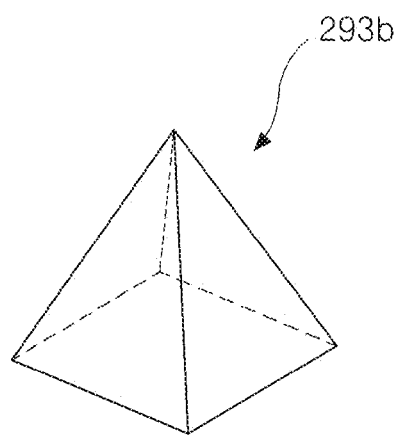
Figure 8D:
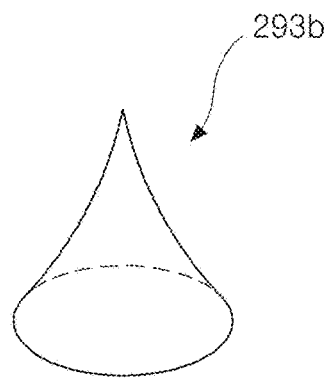

FIGS. 8A to 8D are views schematically showing shapes of the diffusion pattern 293 according to the second embodiment of the present disclosure. FIG. 8A shows the first pattern 293a and FIGS. 8B to 8D show the second pattern 293b.

As shown in FIG. 8A, the first pattern 293a can be configured a curved surface having no vertex. For example, the first pattern 293a can have a hemispherical shape.

On the other hand, as shown in FIGS. 8B to 8D, the second pattern 293b can be a horn shape having a vertex. At this time, the second pattern 293b can be a conical shape of FIG. 8B, a polypyramid shape such as a quadrangular pyramid of FIG. 8C, or a conical shape having a curved side surface of FIG. 8D. However, the first pattern 293a and the second pattern 293b of the present disclosure are not limited thereto, and can have other shapes.

Here, the first pattern 293a can correspond to the reflective pattern 292 in one-to-one correspondence, and the second pattern 293b can correspond to a portion between the adjacent reflective patterns 292 in one-to-one correspondence. Accordingly, the first pattern 293a can correspond to the LED package 220 in one-to-one correspondence, and the second pattern 293b can correspond to a portion between the adjacent LED packages 220 in one-to-one correspondence.

By using such a multi-pattern sheet 290, the second embodiment can obtain substantially the same optical characteristics as those of the first embodiment, and the thickness of the backlight unit 200 can be reduced.

Figure 9:
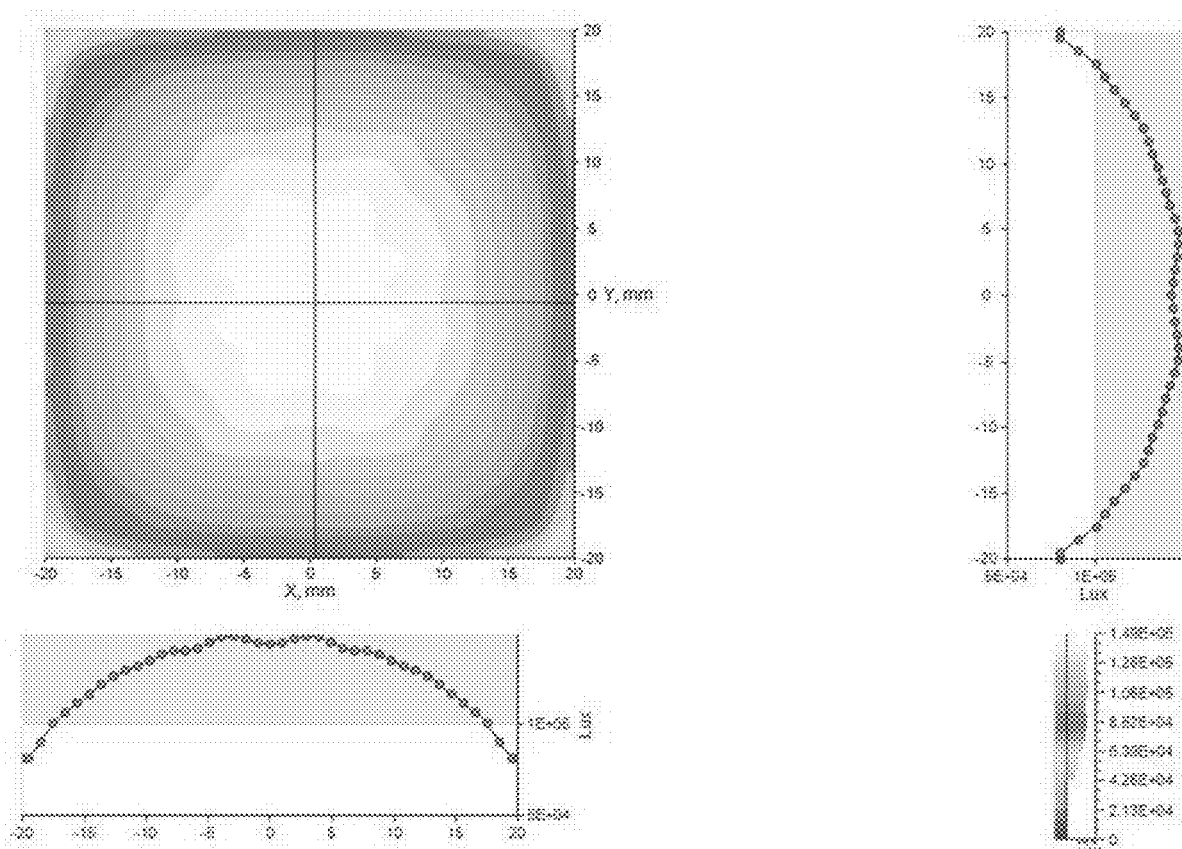
FIG. 9 is a view showing light distribution of a liquid crystal display device according to the first embodiment of the present disclosure.
Figure 10:
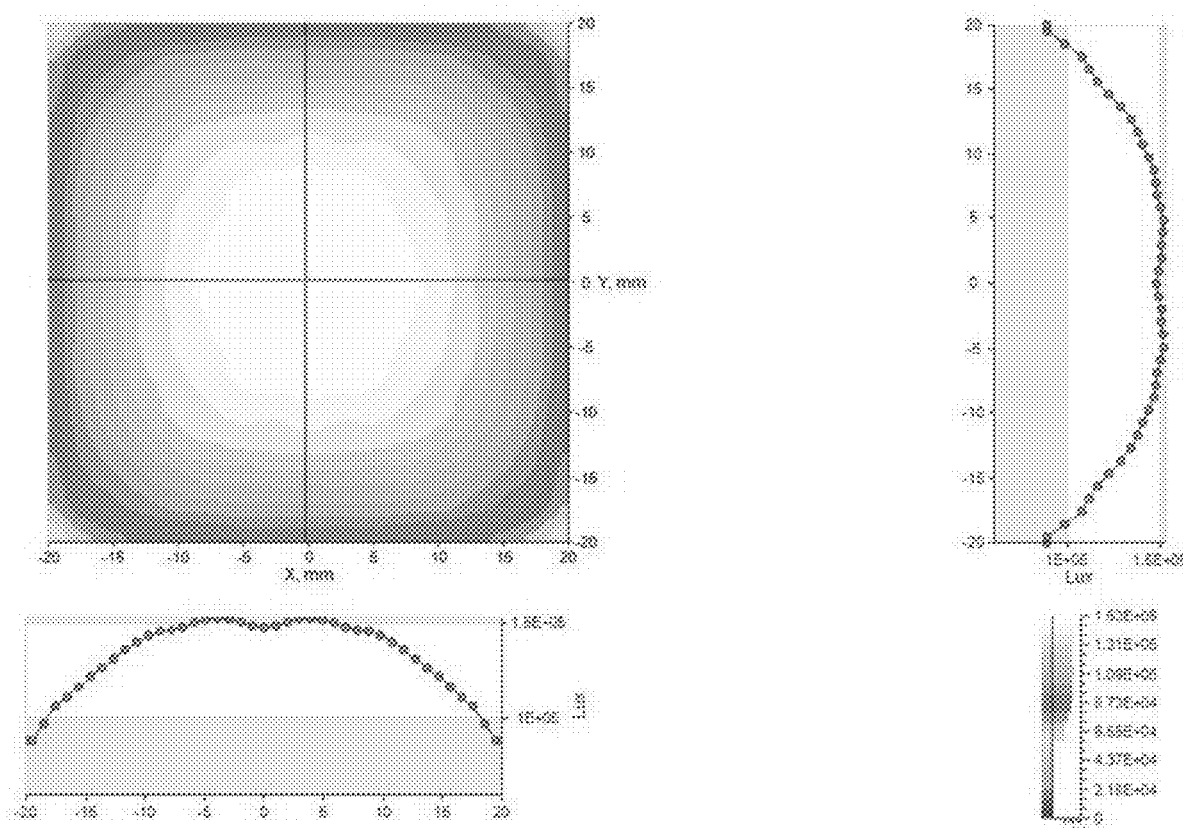
FIG. 10 is a view showing light distribution of a liquid crystal display device according to the second embodiment of the present disclosure.

This thickness reduction will be described with reference to FIGS. 9 and 10 and Tables 1 and 2. FIGS. 9 and 10 are views showing light distribution of the liquid crystal display devices according to the first and second embodiments of the present disclosure. Tables 1 and 2 show thicknesses of elements of the liquid crystal display devices excluding a liquid crystal panel according to the first and second embodiments of the present disclosure. These thicknesses are only an example, and the present disclosure is not limited thereto.

TABLE 1

| elements | thickness[mm] |
|---|---|
| optical sheet(270)(3 sheets) | 0.4 |
| | 0.155 |
| | 0.12 |
| fluorescent sheet(260) | 0.13 |
| diffusion plate(250) | 1.5 |
| reflective pattern sheet(240) | 0.15 |
| encapsulation member(230) | 0.5 |
| LED package(220) | — |
| circuit board(210) | 0.37 |
| adhesive member(120) | 0.1 |
| bottom cover(100) | 0.4 |
| Total | 3.825 (100%) |

TABLE 2

| elements | | thickness[mm] |
|---|---|---|
| optical sheet(270)(3 sheets) | | 0.4 |
| | | 0.155 |
| | | 0.12 |
| multi pattern sheet(290) | diffusion pattern(293) | 0.05 |
| | glass complex object(291) | 0.15 |
| | reflective pattern(292) | 0.02 |
| encapsulation member(230) | | 0.5 |
| LED package(220) | | — |
| circuit board(210) | | 0.37 |
| adhesive member(120) | | 0.1 |
| bottom cover(100) | | 0.4 |
| Total | | 2.265 (59%) |

As shown in FIGS. 9 and 10, it can be seen that the light distribution of the second embodiment is substantially the same as the light distribution of the first embodiment, and thus, in the second embodiment, optical characteristics and an image of substantially the same level as the first embodiment can be realized.

At this time, referring to Table 1, in the first embodiment, the reflective pattern sheet 240 has a thickness of 0.15 mm, the diffusion plate 250 has a thickness of 1.5 mm, and the thickness of the liquid crystal display device having the elements (except for the thickness of the liquid crystal panel) is 3.825 mm.

On the other hand, referring to Table 2, in the second embodiment, the multi-pattern sheet 290 has a thickness of 0.22 mm. That is, the diffusion pattern 293, the glass complex body 291 and the reflective pattern 292 constituting the multi-pattern sheet 290 have thicknesses of 0.05 mm, 0.15 mm, and 0.02 mm, respectively and the thickness of the liquid crystal display device including the elements (except for the thickness of the liquid crystal panel) is 2.265 mm.

As described above, in the second embodiment, the thickness of the multi-pattern sheet 290 is 0.22 mm which is considerably reduced as compared with 1.78 mm (0.15 mm+1.5 mm+0.13 mm), which is a sum of the thicknesses of the reflective pattern sheet 240, the diffusion plate 250, and the fluorescent sheet 260 of the first embodiment. As a result, a total thickness (2.265 mm) of the second embodiment is only about 59% with respect to a total thickness (3.825 mm) of the first embodiment, and thus the thicknesses of the backlight unit and the liquid crystal display device can be drastically reduced.

As described above, according to the second embodiment using the multi-pattern sheet 290, it is possible to effectively realize the backlight unit and the liquid crystal display device having a ultra thin thickness while securing substantially the same optical characteristics as the first embodiment.

Third Embodiment

Figure 11:
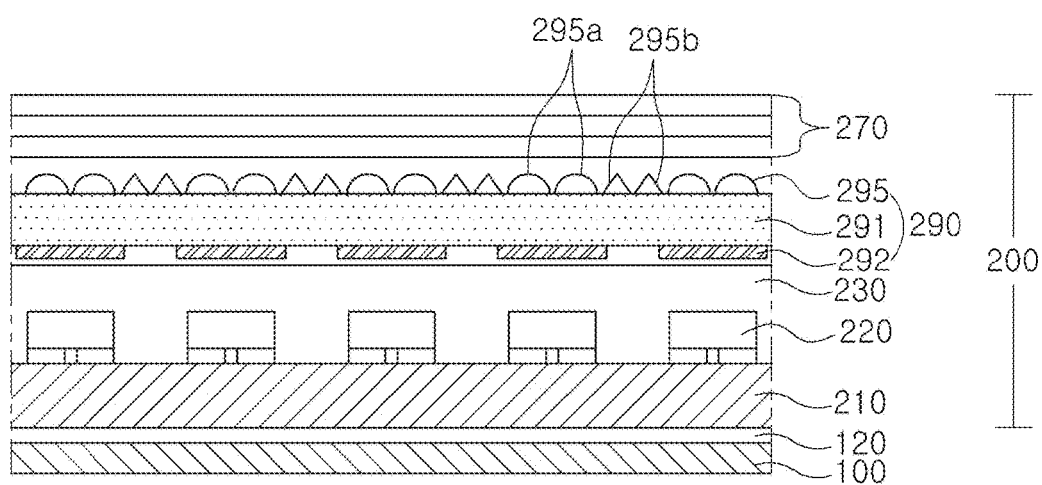
FIG. 11 is a schematic cross-sectional view of a backlight unit according to a third embodiment of the present disclosure.

FIG. 11 is a schematic cross-sectional view of a backlight unit according to a third embodiment of the present disclosure.

The backlight unit according to the third embodiment of the present disclosure has the same structure as that of the second embodiment except for the diffusion pattern of the multi-pattern sheet. The same reference numerals are given to the same parts as those of the second embodiment, and a description thereof will be omitted or simplified.

As shown in FIG. 11, the multi-pattern sheet 290 of the backlight unit 200 according to the third embodiment of the present disclosure can include a plurality of reflective patterns 292 formed on the lower surface of the glass complex body 291 and a plurality of diffusion patterns 295 formed on the upper surface of the glass complex body 291.

Here, the plurality of diffusion patterns 295 can include a plurality of first patterns 295a and a plurality of second patterns 295b alternately arranged. At this time, a plurality of first patterns 295a can correspond to one reflective pattern 292, and a plurality of second patterns 295b can correspond to a portion between adjacent reflective patterns 292. Accordingly, the plurality of first patterns 295a can correspond to one LED package 220, and a plurality of second patterns 295b can correspond to a portion between adjacent LED packages 220.

In the figure, two first patterns 295a are shown as corresponding to one reflective pattern 292 or one LED package 220, but the present disclosure is not limited thereto.

For example, each of the width and length of the LED package 220 can be 700 μm, and each of the width and length of the first pattern 295a and each of the width and length of the second pattern 295b can be 50 μm to 100 μm, preferably, 20 μm to 30 μm.

Here, the adjacent first patterns 295a, the adjacent second patterns 295b, and the first and second patterns 295a and 295b adjacent to each other can be spaced apart from each other or in contact with each other according to required optical characteristics.

The multi-pattern sheet 290 of the backlight unit 200 according to the third embodiment of the present disclosure can provide more uniform surface light as compared with the multi-pattern sheet 290 of the second embodiment.

As described above, according to the embodiments of the present disclosure, the reflective pattern is disposed over the LED package, and the diffusion means such as the diffusion plate or diffusion pattern is disposed thereover. Thus, light is prevented from being output upwardly from the LED package, and the optical distance can be decreased. Accordingly, the mura such as the hot spot can be prevented, thereby improving the image quality, and the backlight unit and the liquid crystal display device in a thin profile can be implemented.

Further, since the single multi-pattern sheet including the reflective pattern, the diffusion pattern and the phosphor is used, the thicknesses of the backlight unit and the liquid crystal display device can be drastically reduced, and the backlight unit and the liquid crystal display device having a ultra thin thickness can be realized while providing an image of a high quality.

It will be apparent to those skilled in the art that various modifications and variations can be made in a device of the present disclosure without departing from the sprit or scope of the embodiment. Thus, it is intended that the present disclosure covers the modifications and variations of this disclosure provided they come within the scope of the appended claims and their equivalents.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A backlight unit, comprising:
a circuit board;
a plurality of LED packages mounted on the circuit board;
an encapsulation member over the circuit board and covering the plurality of LED packages; and
a multi-pattern sheet over the encapsulation member and including
a glass complex body containing a phosphor, and
a plurality of diffusion patterns on an upper surface of the glass complex body,
wherein the plurality of diffusion patterns includes a plurality of first patterns, each of the first patterns aligned with a respective LED package of the plurality of LED packages along a first direction, and a plurality of second patterns, each of the second patterns aligned with a respective portion between adjacent LED packages of the plurality of LED packages along the first direction and alternating the each of the first patterns such that a single second pattern is disposed between adjacent first patterns of the plurality of first patterns,
wherein the first patterns and the second patterns are different patterns,
wherein the single second pattern is a single horn having a vertex, and the single horn is disposed between the adjacent first patterns, and
wherein a width of a bottom surface of the single horn contacting the upper surface of the glass complex body is smaller than a width of a bottom surface of each of the adjacent first patterns contacting the upper surface of the glass complex body.

2. The backlight unit of claim 1, wherein the first patterns include a curved surface without a vertex, and the second patterns include a triangle-like shape with a vertex.

3. The backlight unit of claim 2, wherein the first patterns include a hemispherical shape, and the second patterns include a conical shape, a polypyramid shape, or a conical shape having a curved side surface.

4. The backlight unit of claim 1, wherein the diffusion patterns include at least one of an embossed pattern or a depressed pattern.

5. The backlight unit of claim 1, wherein the multi-pattern sheet further includes a plurality of reflective patterns on a lower surface of the glass complex body, and the plurality of reflective patterns correspond to the plurality of LED packages, respectively.

6. The backlight unit of claim 5, wherein one or more of the plurality of reflective patterns have a transmittance at an edge portion that is higher than a transmittance at a center portion.

7. The backlight unit of claim 6, wherein the one or more of the plurality of reflective patterns includes first, second, and third pattern layers sequentially stacked, and an area of the second pattern layer is smaller than an area of the first pattern layer and greater than an area of the third pattern layer.

8. The backlight unit of claim 5, wherein a width d of each reflective pattern satisfies a following equation, $$d=2\{(b-c)\tan(\theta/2)\},$$

wherein b is a height of the encapsulation member, c is a height of each LED package, and θ is a beam angle of light emitted by the LED package.

9. The backlight unit of claim 1, wherein each LED package includes an LED chip and a reflection member over the LED chip, and the reflection member comprises two successively stacked layers having different refractive indexes.

10. A backlight unit, comprising:
a circuit board;
a plurality of LED packages mounted on the circuit board;
an encapsulation member over the circuit board and covering the plurality of LED packages; and
a multi-pattern sheet over the encapsulation member and including
a glass complex body containing a phosphor,
a plurality of diffusion patterns on an upper surface of the glass complex body, and
a plurality of reflective patterns on a lower surface of the glass complex body,
wherein the plurality of diffusion patterns includes a plurality of first patterns, each of the first patterns aligned with a respective LED package of the plurality of LED packages along a first direction, and a plurality of second patterns, each of the second patterns aligned with a respective portion between adjacent LED packages of the plurality of LED packages along the first direction and alternating the each of the first patterns such that a single second pattern is disposed between adjacent first patterns of the plurality of first patterns,
wherein at least one of the LED packages, at least one of the reflective patterns, and at least one of the first patterns overlap each other,
wherein the first patterns and the second patterns are different patterns,
wherein the single second pattern is a single horn having a vertex, and the single horn is disposed between the adjacent first patterns, and
wherein a width of a bottom surface of the single horn contacting the upper surface of the glass complex body is smaller than a width of a bottom surface of each of the adjacent first patterns contacting the upper surface of the glass complex body.

11. A liquid crystal display device, comprising:
a liquid crystal panel; and
a backlight unit under the liquid crystal panel and including:
a circuit board;
a plurality of LED packages mounted on the circuit board;
an encapsulation member over the circuit board and covering the plurality of LED packages; and
a multi-pattern sheet over the encapsulation member and including
a glass complex body containing a phosphor, and
a plurality of diffusion patterns on an upper surface of the glass complex body,
wherein the plurality of diffusion patterns includes a plurality of first patterns, each of the first patterns aligned with a respective LED package of the plurality of LED packages along a first direction, and a plurality of second patterns, each of the second patterns aligned with a respective portion between adjacent LED packages of the plurality of LED packages along the first direction and alternating the each of the first patterns such that a single second pattern is disposed between adjacent first patterns of the plurality of first patterns, each of the plurality of first patterns being spaced from each single pattern of the plurality of second patterns,
wherein the first patterns and the second patterns are different patterns,
wherein the single second pattern is a single horn having a vertex, and the single horn is disposed between the adjacent first patterns, and
wherein a width of a bottom surface of the single horn contacting the upper surface of the glass complex body is smaller than a width of a bottom surface of each of the adjacent first patterns contacting the upper surface of the glass complex body.

12. The liquid crystal display device of claim 11, wherein the first patterns include a curved surface without a vertex, and the second patterns include a triangle-like shape with a vertex.

13. The liquid crystal display device of claim 12, wherein the first patterns include a hemispherical shape, and the second patterns include a conical shape, a polypyramid shape, or a conical shape having a curved side surface.

14. The liquid crystal display device of claim 11, wherein the multi-pattern sheet further includes a plurality of reflective patterns on a lower surface of the glass complex body, and the plurality of reflective patterns correspond to the plurality of LED packages, respectively.

15. The liquid crystal display device of claim 14, wherein one or more of the plurality of reflective patterns have a transmittance at an edge portion that is higher than a transmittance at a center portion.

16. The liquid crystal display device of claim 15, wherein the one or more of the plurality of reflective patterns includes first, second, and third pattern layers sequentially stacked, and an area of the second pattern layer is smaller than an area of the first pattern layer and greater than an area of the third pattern layer.

17. The liquid crystal display device of claim 14, wherein a width d of each reflective pattern satisfies a following equation, $$d=2\{(b-c)\tan(\theta/2)\},$$

wherein b is a height of the encapsulation member, c is a height of each LED package, and θ is a beam angle of light emitted by the LED package.

18. The liquid crystal display device of claim 11, wherein each LED package includes an LED chip and a reflection member over the LED chip, and the reflection member comprises two successively stacked layers having different refractive indexes.

19. The backlight unit of claim 1, wherein each LED package overlaps with a center of a first pattern and is spaced apart from a center of a second pattern adjacent to the center of the first pattern.

20. The backlight unit of claim 10, wherein the at least one of the LED packages overlaps with a center of the at least one of the first patterns and is spaced apart from a center of a second pattern adjacent to the center of the at least one of the first patterns.

21. The liquid crystal display device of claim 11, wherein each LED package overlaps with a center of a first pattern and is spaced apart from a center of a second pattern adjacent to the center of the first pattern.

22. The liquid crystal display device of claim 11, wherein each of the first patterns is overlapped with the respective LED package of the plurality of LED packages.

23. A backlight unit, comprising:
a circuit board;
a plurality of LED packages mounted on the circuit board;
an encapsulation member over the circuit board and covering the plurality of LED packages; and
a multi-pattern sheet over the encapsulation member and including
a glass complex body containing a phosphor, and
a plurality of diffusion patterns on an upper surface of the glass complex body,
wherein the plurality of diffusion patterns includes a plurality of first patterns, two first patterns aligned with a respective LED package of the plurality of LED packages along a first direction, and a plurality of second patterns, two second patterns aligned with a respective portion between adjacent LED packages of the plurality of LED packages along the first direction and alternating the two first patterns,
wherein the two first patterns have a same size, and the two second patterns have a same size,
wherein the first patterns and the second patterns are different patterns, and
wherein a width of a bottom surface of each of the two second patterns contacting the upper surface of the glass complex body is smaller than a width of a bottom surface of each of the two first patterns contacting the upper surface of the glass complex body.

24. The backlight unit of claim 1, wherein a maximum thickness of the encapsulation member is five times a thickness of each of the plurality of LED packages.

* * * * *